Figure 1:
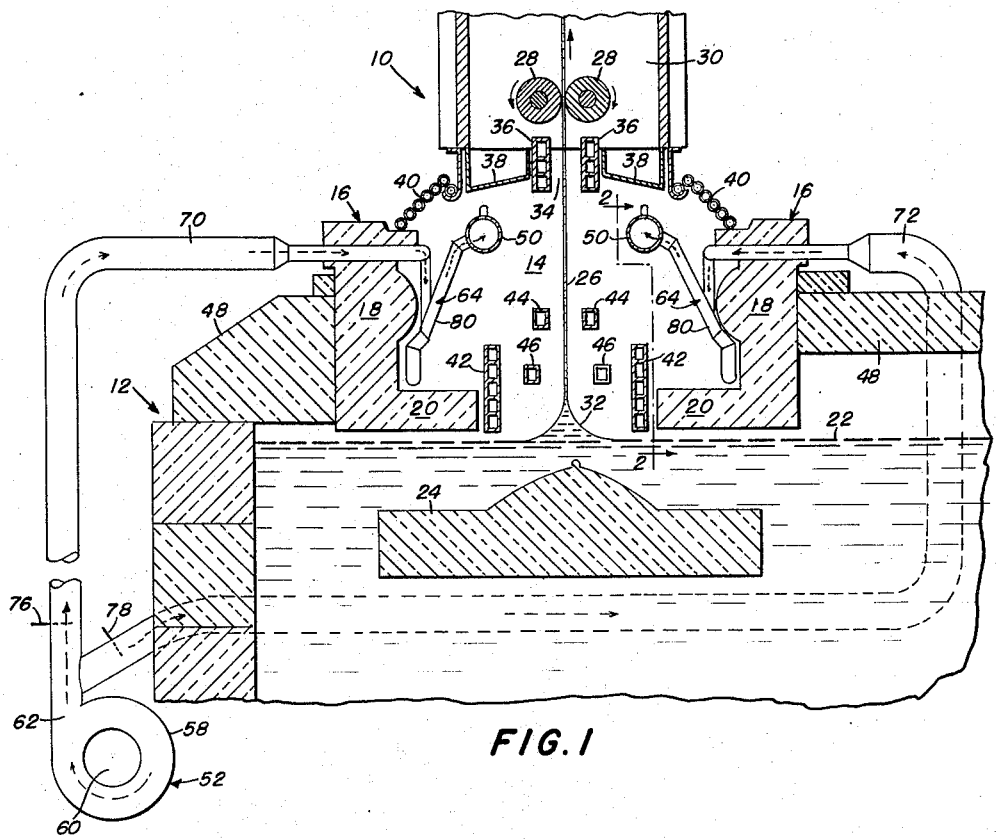

Nov. 22, 1960   F. V. ATKESON ET AL   2,960,800
APPARATUS FOR DRAWING SHEET GLASS
Filed Jan. 9, 1958

INVENTORS
**F. V. ATKESON
W. W. BALTZER**

BY   Oscar H. Spencer

ATTORNEY

United States Patent Office 2,960,800
Patented Nov. 22, 1960

2,960,800

APPARATUS FOR DRAWING SHEET GLASS

Florian V. Atkeson, Springdale, Pa., and William W. Baltzer, Clarksburg, W. Va., assignors to Pittsburgh Plate Glass Company, Allegheny County, Pa., a corporation of Pennsylvania Filed Jan. 9, 1958, Ser. No. 707,892

2 Claims. (Cl. 49—17)

This invention relates to the manufacture of sheet glass and it has particular reference to apparatus for drawing sheet glass or window glass from a molten glass batch.

Halbach et al. in their United States Patent Number 2,519,457 disclosed a method and apparatus for drawing sheet glass, of a quality fairly comparable with plate glass, in which a gaseous fluid is introduced into the drawing chamber to dampen, approximately dissipate or choke off draft action and convection current along the surfaces of the sheet glass being drawn from a molten glass batch or bath. One such arrangement for so introducing gaseous fluid, such as heated air, includes manifolds disposed on opposite sides of the sheet glass and provided with openings for expelling fluid upwardly into the upper zone of the drawing chamber, while creating a quiescent zone in the lower portion thereof along the sheet glass. This arrangement entails the use of a suitable fluid control apparatus for supplying the gaseous fluid to the manifold. Such a control apparatus generally comprises a muffle furnace, usually located in the basement of the building housing the drawing chamber, for heating the gaseous fluid, and means such as a blower and conduit for supplying the heated gaseous fluid to the manifold. The muffle furnace is costly to build and to operate, and requires periodic rebuilding, an expensive operation. Also, there is considerable heat loss in the conduits connecting the control apparatus to the manifolds, thereby requiring the fluid to be heated to a higher temperature than necessary at the manifold, with the resulting use of more fuel.

The present invention proposes an arrangement whereby the muffle furnace previously employed is completely eliminated, thereby eliminating its initial cost, cost of operation and cost of rebuilding. The arrangement also provides for the elimination of any heat losses from a fluid pressure means, such as a blower, to the manifold, thereby reducing the cost of operation of the device. In addition to the above, the present invention proposes an arrangement whereby the cost of heating the gaseous fluid is eliminated, this being accomplished by utilizing the residual heat in the drawing chamber which would otherwise be wasted.

Therefore, one object of the invention is to provide improved apparatus for drawing sheet glass which compares favorably in smoothness and uniformity of thickness to ground and polished plate glass.

Another object of the invention is to provide an improved arrangement for heating and introducing gaseous fluid into a drawing chamber of a glass melting tank for producing sheet glass which compares favorably in smoothness and uniformity of thickness to ground and polished plate glass.

Figure 2:
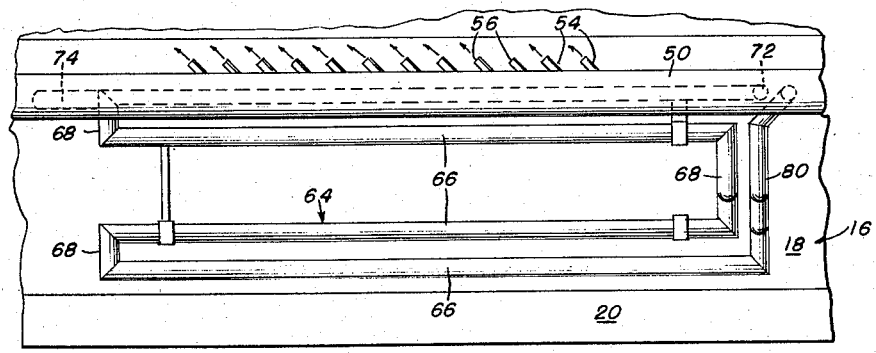

Additional objects and features of this invention will become apparent from the following description when taken with the accompanying drawing, in which:

Figure 1 is a vertical section of a sheet glass drawing apparatus including a drawing chamber and a vertical lehr into which the glass is adapted to be drawn, the drawing apparatus also including the novel structure of this invention; and Figure 2 is a view taken on line 2—2 of Figure 1.

Referring now to the drawing, there is illustrated a sheet glass drawing apparatus, generally identified as 10, which includes a glass melting tank 12 provided with a drawing chamber 14 partially defined by L-blocks 16 having vertical flange sections 18 and lower horizontal flange sections 20, the latter being arranged just above and substantially parallel to the surface of a molten glass bath 22 contained in the tank 12 and flowing into the drawing chamber 14. The vertical plane of the glass drawing, in its beginning, is determined by a draw bar 24 of conventional form from which the glass is drawn upwardly into the form of sheet glass 26. It is to be noted that the draw bar shown and described in the aforementioned patent may also be used within the scope of this invention.

Pairs of driven rolls 28 are mounted in a lehr 30 constructed above the drawing chamber 14 to receive the sheet 26 between rolls of each pair, and provide power to maintain uniform upward movement of the sheet glass. The rolls 28 and the draw bar 24 define the plane of drawing of the sheet glass. The sheet glass from its base or meniscus 32 passes upwardly through a horizontal opening or slot 34 between cullet pan coolers 36, so called because they are located adjacent and between a pair of cullet pans 38 which form a portion of the roof of the drawing chamber and define the opening 34. The upper edge of each cullet pan cooler 36 is disposed closely adjacent the periphery of a lower driven roll 28 and this arrangement facilitates the control of air or gas as it moves upwardly from the upper opening in the drawing chamber.

Fluid-containing coolers 40 for circulating water, or the like, are mounted adjacent the outer sides of the cullet pans 38 between the latter and the upper portion of the vertical flange sections 18 of the L-blocks 16. These coolers 40 are conventional in construction and function and constitute a portion of the enclosing wall structure of the drawing chamber.

So-called big coolers 42 are disposed transversely of the drawing chamber substantially parallel to the plane of drawing and are disposed in spaced relation to opposite side thereof. Each big cooler 42 includes conventional fluid supply conduits (not shown) for circulating therethrough water, or other fluid, and these big coolers, which are somewhat flat in contour, are arranged adjacent the inner extremities of the lower horizontal sections 20 of the L-blocks 16 and extend upwardly in such position as to have their top edges disposed upwardly a considerable distance toward the central portion of the chamber 14. They present flat sides or walls in spaced relation on opposite sides of the lower portion of the sheet 26.

Other coolers designated as door coolers 44 and baby coolers 46 are arranged in spaced relation, one above the other, on each side of the sheet glass 26. These coolers are provided with conventional fluid circulating conduits (not shown) and suitable fluid, such as water, is supplied thereto in a conventional manner for the purpose of insuring more favorable speed and cooling action in drawing the glass.

The structure just described, including the L-blocks 16, various coolers 36, 40, 42, 44 and 46, cullet pans 38, lehr 30, etc., are all supported in the walls 48 of the glass melting tank, or are carried upon suitable foundations (not shown) in connection with the conventional construction of the melting tank.

In the upper portion of the drawing chamber 14, two substantially horizontal fluid discharging conduits or manifolds 50 are carried in the tank walls 48 and are connected to suitable fluid supply means, generally identified as 52, in a manner to be described. These conduits or manifolds 50 are substantially parallel and are disposed approximately at equal distances on opposite sides of the sheet glass 26. Each conduit or manifold, which is closed at one end, has a row of nipples 54 integral therewith. These nipples 54 are disposed at an angle to the horizontal on the upper portion of each manifold 50 and they have openings 56 therein communicating with the interior of the manifold. Although these nipples are sloping they face generally upwardly in planes adjacent opposite sides of the plane of drawing and communicate through the conduits or manifolds 50 with the fluid supply means 52. It is to be understood that the angle of sloping need not be considered absolute, so long as the nipples slope upwardly materially and sufficiently to discharge air or other gaseous fluid in an upward direction to produce the desired results. It has been found that by sloping the nipples at an angle of approximately 45 degrees superior results are produced.

The fluid supply means 52 for supplying gaseous fluid, such as air or the like, to the manifolds 50 to be discharged through the nipple openings 56 comprises a pressure blower 58 of a conventional design, which may be located in the basement of the building housing the glass melting tank 12, having an inlet 60 and an outlet 62. Heat exchangers 64 are located in the drawing chamber 14 on opposite sides of the glass sheet 26 closely adjacent the L-blocks 16 and each comprises a plurality of horizontal conduit sections 66 and connecting vertical conduit sections 68, as illustrated in Figure 2. The heat exchangers 64 are each provided at one top end with rearwardly extending portions passing through the L-block for connection to conduits 70 and 72 connected to the blower outlet 62 by means of a Y-joint, and at the other top end with rearwardly extending false arms 74 for connecting them to the respective L-block. The conduit 70 is provided with a valve means, such as a sliding gate valve 76, to regulate the flow of fluid to the front heat exchanger, and the conduit 72 is provided with a valve means, such as a sliding gate valve 78 to regulate the flow of air to the back heat exchanger. The heat exchangers 64 are provided at one lower end with conduits 80 which are angled for connection with the manifolds 50. These conduits 80 may be flexible in part or may be connected to the respective manifold by means of conventional rotary ring connections, for a purpose to be described.

Thus, air or other gaseous fluid supplied by the blower 58 to the manifolds 50 is heated by the residual heat in the drawing chamber 14 by passing through the heat exchangers 64. The amount of fluid supplied to each manifold 64 is independently controllable by means of the gate valves 70 and 72. Since the quantity of fluid to each manifold is independently controlled by means of a gate valve, the temperature of the fluid to each manifold may thereby be controlled.

Fluid under pressure and heated as desired by means of the fluid supply means 52 including the heat exchangers 64 is thus available to be discharged through the openings 56 into the upper zone of the drawing chamber 14. In order that the direction of discharge of the fluid from the openings 56 can be controlled with precision, each conduit or manifold 50 is so constructed to be rotatable about its longitudinal axis, this flexibility being provided by the use of the flexible conduit connecting the heat exchangers 64 to the manifolds 50 or by the use of the ring couplings, as previously mentioned.

As fully explained in the aforementioned patent, the discharge of the gaseous fluid, such as heated air, through the nipple openings 56 creates quiescent zones wherein hot films of air along the glass surfaces are not wiped off by strong drafts or other air currents in the drawing chamber, thereby insuring against warping or other distortion of the glass sheet as it begins to set.

The arrangement just described provides one which will produce results comparable to those set forth in the aforementioned patent and, as is obvious, the arrangement can be built, operated and maintained for much less cost than that described in the patent. In the present arrangement, there is no furnace required for heating the gaseous fluid, thereby eliminating its initial cost of building, its cost of operation and its cost of maintenance which includes the cost of periodically rebuilding. Also, the fluid is heated in the heat exchangers, which are relatively simple to build and install, and will last for a considerable length of time, by the residual heat in the drawing chamber, which heat would normally be exhausted to the atmosphere and thereby wasted.

We claim:

1. In an apparatus for drawing sheet glass from a molten glass bath and including a drawing chamber, glass drawing means defining a plane of drawing through said chamber, manifolds disposed on opposite sides of the plane of drawing, each of said manifolds extending substantially the width of the chamber and having a row of openings formed therein for discharging heated gaseous fluid into said drawing chamber, means including a heat exchanger in said drawing chamber communicating with said manifolds, and means for supplying gaseous fluid under pressure to said manifolds by way of said heat exchanger so as to provide heated gaseous fluid for discharge through said openings into said chamber.

2. In an apparatus for drawing sheet glass from a molten glass bath and including a drawing chamber, L-blocks partially defining said drawing chamber, glass drawing means defining a vertical plane of drawing through said chamber, manifolds disposed on opposite sides of the plane of drawing, each of said manifolds extending substantially the width of the chamber and having a row of openings formed therein for discharging fluid into said drawing chamber, means including a pair of heat exchangers within said chamber positioned on opposite sides of the plane of drawing, each of said heat exchangers being connected to one of said L-blocks and communicating with one of said manifolds, and means for supplying gaseous fluid under pressure to said manifolds by way of said heat exchangers so as to provide heated gaseous fluid for discharge through said openings into said chamber.

References Cited in the file of this patent

UNITED STATES PATENTS

| | | |
|---|---|---|
| 2,006,167 | Hohmann | June 25, 1935 |
| 2,125,914 | Haight | Aug. 9, 1938 |
| 2,519,457 | Halbach et al. | Aug. 22, 1950 |